(12) United States Patent
He et al.

(10) Patent No.: US 8,623,965 B2
(45) Date of Patent: *Jan. 7, 2014

(54) SULFURIZED POLYACRYLONITRILE AND LITHIUM-ION BATTERY CATHODE ACTIVE MATERIAL USING THE SAME

(75) Inventors: Xiang-Ming He, Beijing (CN); Li Wang, Beijing (CN); Wei-Hua Pu, Beijing (CN); Wen-Ting Sun, Beijing (CN); Jian-Jun Li, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 68 days.

This patent is subject to a terminal disclaimer.

(21) Appl. No.: 13/051,131

(22) Filed: Mar. 18, 2011

(65) Prior Publication Data

US 2012/0059128 A1   Mar. 8, 2012

(30) Foreign Application Priority Data

Sep. 8, 2010   (CN) .......................... 2010 1 0275623

(51) Int. Cl.
  *C08F 8/34* (2006.01)
  *H01M 4/137* (2010.01)
  *C08F 8/42* (2006.01)
  *C08F 20/44* (2006.01)

(52) U.S. Cl.
  USPC .................... 525/329.1; 525/329.2; 525/343; 525/344; 525/353; 525/354; 429/213

(58) Field of Classification Search
  USPC ........... 525/329.1, 329.2, 343, 344, 353, 354; 429/213
  See application file for complete search history.

(56) References Cited

U.S. PATENT DOCUMENTS

2011/0200875 A1*  8/2011  Miyuki et al. ................ 429/213

FOREIGN PATENT DOCUMENTS

CN       101800312         8/2010
WO    WO 2010/044437 A1 *  4/2010

OTHER PUBLICATIONS

Fanous et al., Chemistry of Materials 23 (2011) 5024-5028.*
"The structure property and application of conductive material of pyrolytic polyacrylonitrile", Yao et al. pp. 39-43, vol. 33, No. 1, 2001, Journal of Northeast normal University.
"Fabrication of Li-ion battery with sulfurized polyacrylonitrile", Ren et al. pp. 73-74, vol. 38, No. 2, 2008, Battery Bimonthly.
Maria Daranyi, "Beneficial effect of multiwall carbon nanotubes on the graphitization of polyacrylonitrile (PAN) coating", Processing and Application of Ceramics, vol. 4, No. 2, pp. 59-62, May 31, 2010.

* cited by examiner

*Primary Examiner* — Roberto Rabago
(74) *Attorney, Agent, or Firm* — Altis Law Group, Inc.

(57) ABSTRACT

The present disclosure relates to a sulfurized polyacrylonitrile and a lithium-ion battery cathode active material. The sulfurized polyacrylonitrile includes a structural unit. A general molecular formula of the structural unit is $\text{--}[\text{C}_3\text{HNS}]\text{--}_n$, in which n is a positive integer. The lithium-ion battery cathode active material includes sulfurized polyacrylonitrile and a sulfurized polyacrylonitrile with inserted ions.

4 Claims, 19 Drawing Sheets

US 8,623,965 B2

SULFURIZED POLYACRYLONITRILE AND LITHIUM-ION BATTERY CATHODE ACTIVE MATERIAL USING THE SAME

CROSS-REFERENCE TO RELATED APPLICATIONS

This application claims all benefits accruing under 35 U.S.C. §119 from China Patent Application No. 201010275623.1, filed on Sep. 8, 2010, in the China Intellectual Property Office, the disclosure of which is incorporated herein by reference. This application is related to commonly-assigned applications entitled, "METHOD FOR MAKING CONJUGATED POLYMER," filed on Mar. 18, 2011 and application Ser. No. 13/051,123, now U.S. Pat. No. 8,273,829; "METHOD FOR MAKING SULFURIZED POLYACRYLONITRILE," filed on Mar. 18, 2011 and application Ser. No. 13/051,117, now U.S. Pat. No. 8,372,919; "PHOTOELECTRIC CONVERSION COMPONENT AND METHOD FOR MAKING THE SAME," filed on Mar. 18, 2011 and application Ser. No. 13/051,148, now U.S. Pat. No. 8,450,605.

BACKGROUND

1. Technical Field

The present disclosure relates to sulfurized polyacrylonitrile and lithium-ion battery cathode active material using the same.

2. Description of Related Art

Polyacrylonitrile (PAN) is a high polymer composed of saturated carbon skeleton containing cyano groups (C≡N) on alternate carbon atoms. PAN itself is not conductive but can be sulfurized to form sulfurized polyacrylonitrile which is conductive and chemically active. Specifically, the PAN powder and sulfur is mixed to form a mixture. The mixture is then heated, thereby forming sulfurized polyacrylonitrile. The PAN may have a cyclization reaction first during the process of forming the sulfurized polyacrylonitrile. Thus, the sulfurized polyacrylonitrile is a conjugated polymer having long-range π-type bonds. The sulfurized polyacrylonitrile can be used as a positive material of a lithium-ion battery and has a high specific capacity.

However, a cyclization degree of the sulfurized polyacrylonitrile fabricated by the above method is low, namely, the amount of the conjugated π bonds in the sulfurized polyacrylonitrile are few. Thus, an electrical conductivity of the sulfurized polyacrylonitrile is low.

What is needed, therefore, is to provide a sulfurized polyacrylonitrile having high cyclization degree and a lithium-ion battery cathode active material using the same.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

First, a conjugated polymer for making a sulfurized polyacrylonitrile is provided.

Figure 1:
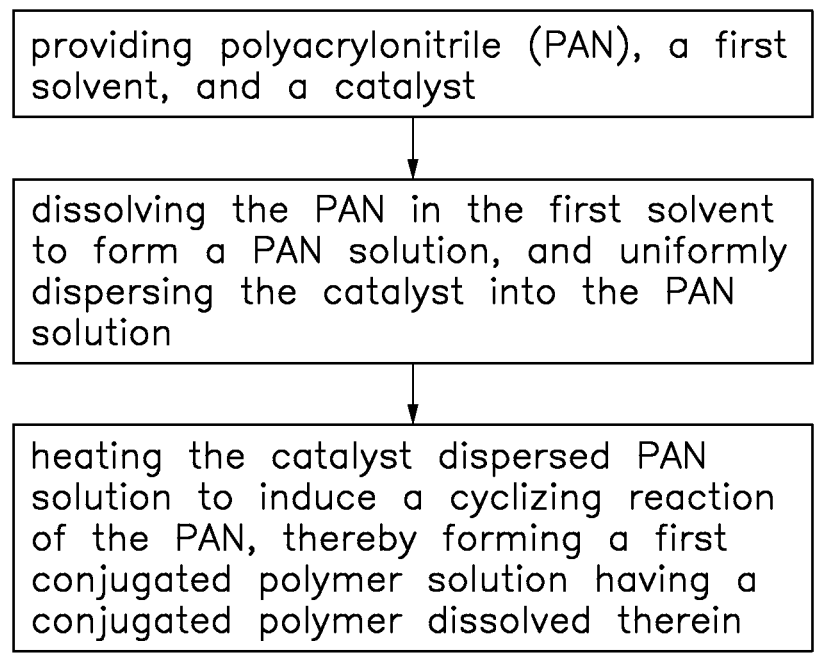
FIG. 1 is a flow chart of one embodiment of a method for making a conjugated polymer, the conjugated polymer is used for making a sulfurized polyacrylonitrile.

Referring to FIG. 1, one embodiment of a method for making the conjugated polymer includes the following steps:

S1, providing polyacrylonitrile (PAN), a first solvent, and a catalyst;

S2, dissolving the PAN in the first solvent to form a PAN solution, and uniformly dispersing the catalyst into the PAN solution; and S3, heating the catalyst dispersed PAN solution to induce a cyclizing reaction of the PAN, thereby forming a first conjugated polymer solution having a conjugated polymer dissolved therein.

In the step S1, the first solvent can completely dissolve the PAN. The first solvent can be a polar organic solvent. The polar organic solvent can be dimethyl formamide (DMF), dimethylacetamide (DMAC), dimethyl sulfoxide (DMSO), malononitrile, sulfolane, or ethyl nitrite. A molecular weight of PAN is not limited. In one embodiment, the molecular weight of PAN is in a range from about 1000 to about 100000. The catalyst can be metal powder, metal oxide powder, metal salt powder, sulfur powder, or any combination thereof. Metal elements in the metal powder, metal oxide powder, and metal salt can be transition elements, group IVA elements, group VA elements, or any combination thereof. The catalyst can be either soluble or insoluble to the PAN solution. The metal powder can be silver powder, copper powder, tin powder, iron powder, cobalt powder, or nickel powder. The metal oxide powder can be titanium oxide powder, copper oxide powder, or iron oxide powder. The metal salt can be cobalt salt, tin salt, copper salt, nickel salt, or zinc salt, for example, cobalt nitrate ($Co(NO_3)_2$), zinc chloride ($ZnCl_2$), or antimony chloride ($SbCl_3$). If the catalyst is insoluble to the PAN solution, the smaller the diameter of the catalyst particles, the easier the catalyst particles are dispersed into the PAN solution, the faster the cyclizing of the PAN, and the faster the conjugated polymer is formed in the step S3. The diameter of the catalyst particles can be in a range from about 50 nanometers (nm) to about 500 micrometers ($\mu$m). In one embodiment, the diameter of the catalyst particles is in a range from about 100 nm to about 100 $\mu$m. In addition, the more catalyst that is dispersed, the faster the cyclizing of the PAN. A mass ratio of the catalyst to the PAN can be in a range from about 1:0.2 to about 1:6.

In the step S2, a mass concentration of the PAN solution is not limited. In one embodiment, the mass concentration of the PAN solution is in a range from about 0.1% to about 10%.

In step S3, the PAN solution with the catalyst therein can be heated in a water or oil bath. The heating temperature can be in a range from about 80 degrees Celsius to about 300 degrees Celsius to induce the cyclizing reaction of the PAN within a short period, thereby forming a soluble conjugated polymer dissolved in the first solvent. In addition, an insoluble conjugated polymer cannot be formed and cannot be precipitated from the first conjugated polymer solution in the heating temperature range. The heating period can be set to sufficiently form soluble conjugated polymer. The heating period can be in a range from about 5 minutes to about 20 minutes. Color changes of the PAN solution can be observed to determine if the conjugated polymer is formed or not. In one embodiment, when the PAN solution color becomes black, the conjugated polymer is formed. The darker the solution color, the higher the conjugated polymer cyclizing level.

In the heating process, the PAN solution with the catalyst therein can be further agitated to sufficiently mix the catalyst and the PAN in the first solvent, and speed up the formation of the conjugated polymer. The agitating method is not limited, and can be magnetic stirring, ultrasonic dispersion, or mechanical agitation. An agitating rate is not limited. If the mechanical agitation is used, the agitating speed can be in a range from about 100 rotations per minute (rpm) to about 1000 rpm.

The first conjugated polymer solution is composed of the conjugated polymer formed by cyclizing the PAN, the catalyst, and the first solvent. The conjugated polymer is soluble in the first solvent. The catalyst can be soluble or insoluble in the first solvent. If the catalyst is not insoluble in the first solvent, the catalyst exists in the form of particles.

Furthermore, after forming the first conjugated polymer solution, a step S4 can be provided to remove the catalyst and the first solvent.

In step S4, if the catalyst is insoluble in the first solvent, the catalyst can be filtered out of the first conjugated polymer solution using a filter gauze. The filter gauze defines a plurality of holes having diameters less than the diameters of the catalyst particles. If the catalyst is soluble in the first solvent, the catalyst can be separated out along with the first solvent. In one embodiment, a solvent filter can be used to separate out the first solvent and the catalyst from the first conjugated polymer solution, thereby only leaving the pure conjugated polymer having a black powder shape. In another embodiment, the first conjugated polymer solution can be slowly heated below a low temperature (e.g. 80 Celsius degrees), thereby volatilizing the first solvent. After the first solvent is volatilized, a resonance filter or a centrifugal machine can separate the catalyst and the conjugated polymer from each other according to specific gravity difference or electromagnetic difference therebetween.

The method for making the conjugated polymer is described by the following examples.

Example 1

In this example, the mass concentration of the PAN solution is about 5%. The catalyst is silver powder having a particle diameter of about 100 $\mu$m. The silver powder and the PAN are dispersed in the PAN solution with a ratio of the silver powder to the PAN being about 1:2.5. The PAN solution with silver powder is heated at about 150 degrees Celsius by an oil bath, along with agitating the PAN solution at a rotating speed of about 500 rpm.

Specifically, the first solvent is DMF in the PAN solution. The PAN solution is heated for about 12 hours to cyclize the PAN until the PAN solution becomes black, thereby forming the conjugated polymer by the PAN cyclizing reaction.

Furthermore, the silver powder is separated out using the filter gauze, and the first solvent is separated out using the solvent filter, thereby forming the conjugated polymer.

Figure 2:
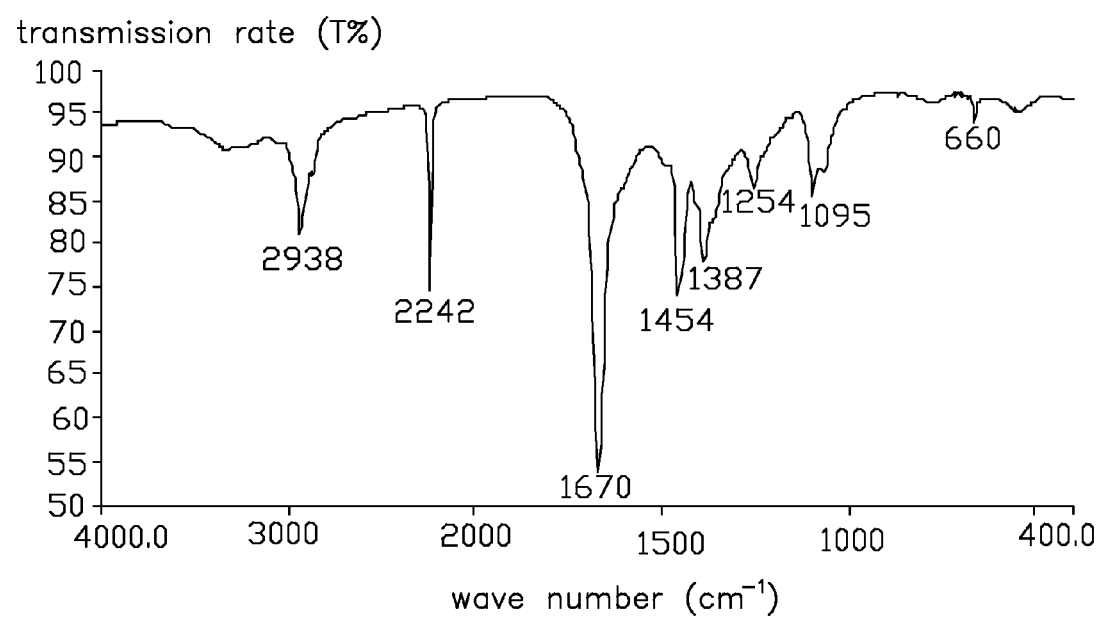
FIG. 2, FIG. 4, FIG. 6, FIG. 8, and FIG. 10 are Fourier Transform infrared spectroscopy (FTIR) spectrum test graphs of embodiments of the conjugated polymers.

Referring to FIG. 2, the achieved conjugated polymer of Example 1 is tested. Wherein the characteristic absorption peak at 2242 $cm^{-1}$ corresponds to the $C\equiv C$ bonds, the characteristic absorption peak at 2938 $cm^{-1}$ corresponds to the $CH_2$ bonds, the characteristic absorption peak at 1387 $cm^{-1}$ corresponds to the CH bonds, and the characteristic absorption peak at 1670 $cm^{-1}$ corresponds to the $C=N$ bonds or $C=C$ bonds in the conjugated polymer. The characteristic absorption peak of $C=N$ bonds or $C=C$ bonds at 1670 $cm^{-1}$ indicating the PAN cyclizing reaction has occurred during the above method.

Figure 3:
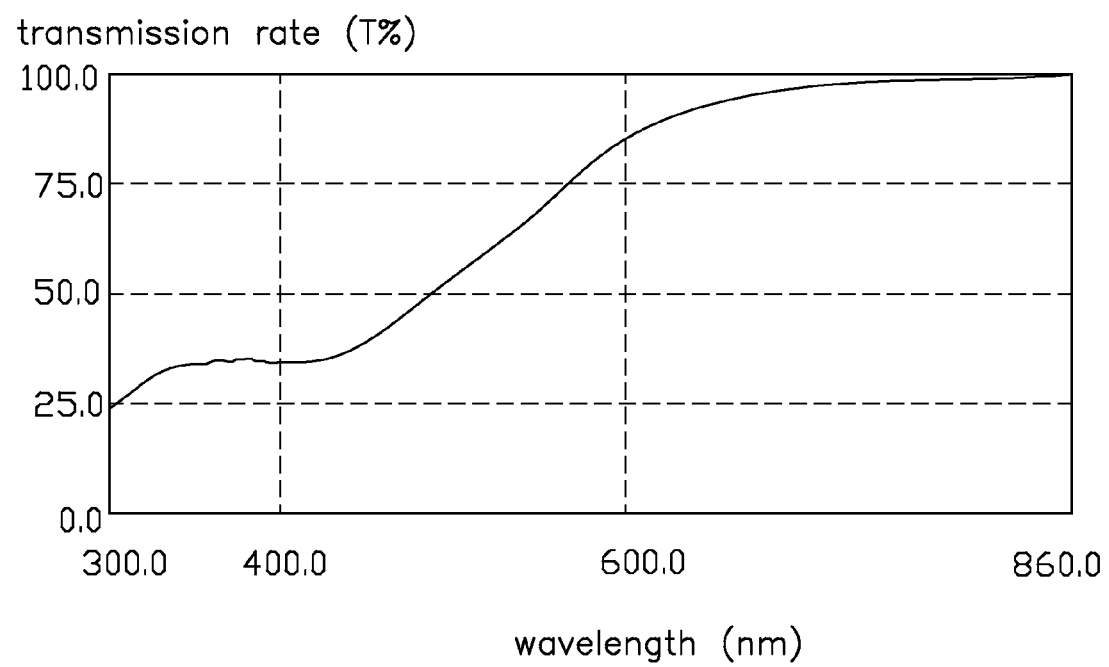
FIG. 3, FIG. 5, FIG. 7, FIG. 9, and FIG. 11 are ultraviolet-visible absorption spectrum test graphs of embodiments of the conjugated polymers.

In addition, the non-conjugated unsaturated polymer can absorb ultraviolet light having a relatively short wavelength. If a polymer has conjugated typed double bonds, the polymer can absorb ultraviolet light having a relatively long wavelength or visible light. The greater the conjugated typed double bonds, the more the polymer absorbs the intensity of the light having the long wavelength. Referring to FIG. 3, an ultraviolet-visible absorption spectrum test graph of the obtained conjugated polymer of Example 1 is measured. The conjugated polymer intensively absorbs ultraviolet light having a wavelength in a range from about 300 nm to about 400 nm, and weakly absorbs ultraviolet light having a wavelength in a range from about 400 nm to about 600 nm and visible light having a wavelength greater than 600 nm. Thus, the absorption of ultraviolet light and visible light having a long wavelength indicates that the conjugated typed double bonds exist in the conjugated polymer.

It is further proven that the soluble conjugated polymer has been formed in Example 1 by analyzing FIGS. 2 and 3.

Example 2

In this example, the mass concentration of the PAN solution is about 3%. The catalyst is the sulfur powder having a particle diameter of about 100 nm. A mass ratio of the sulfur powder to the PAN is about 1:0.5. The PAN solution with the sulfur powder therein is heated at about 150 degrees Celsius by an oil bath, along with agitating the PAN solution at a rotating speed of about 500 rpm.

Specifically, the first solvent is DMSO. The PAN solution is heated for about 24 hours to cyclize the PAN until the PAN solution becomes black, thereby forming the conjugated polymer by the PAN cyclizing reaction.

Furthermore, the sulfur powder is separated out using the filter gauze, and the first solvent is separated out using the solvent filter, thereby forming the conjugated polymer.

Figure 4:
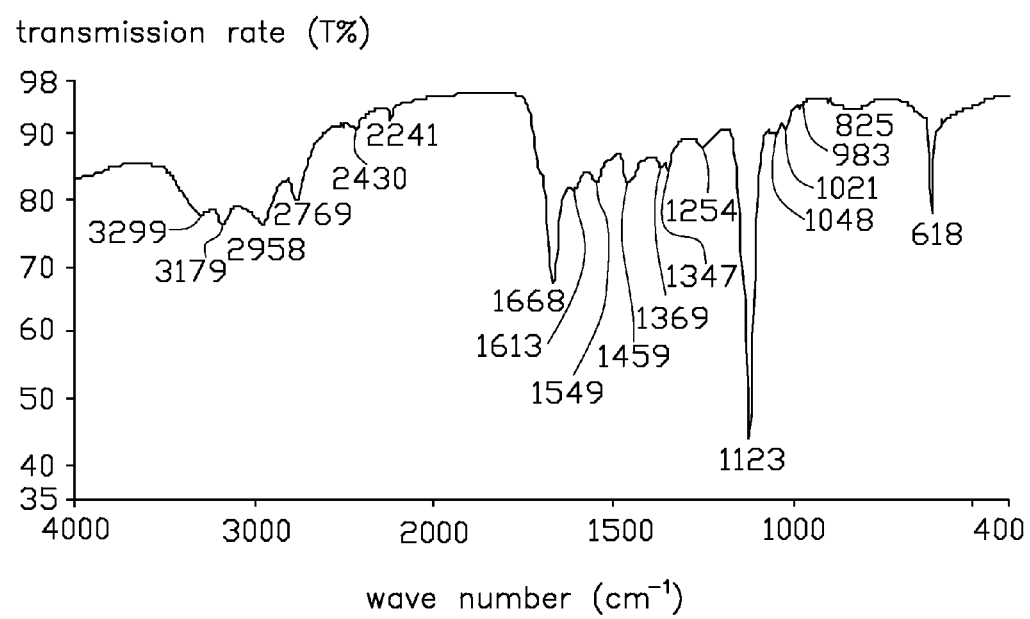

Referring to FIG. 4, the achieved conjugated polymer of the example 2 is tested, the characteristic absorption peak at about 1668 $cm^{-1}$ corresponds to C=N bonds or C=C bonds. The characteristic absorption peak at about 1668 $cm^{-1}$ indicates a cyclizing reaction of the PAN has happened during the above method.

Figure 5:
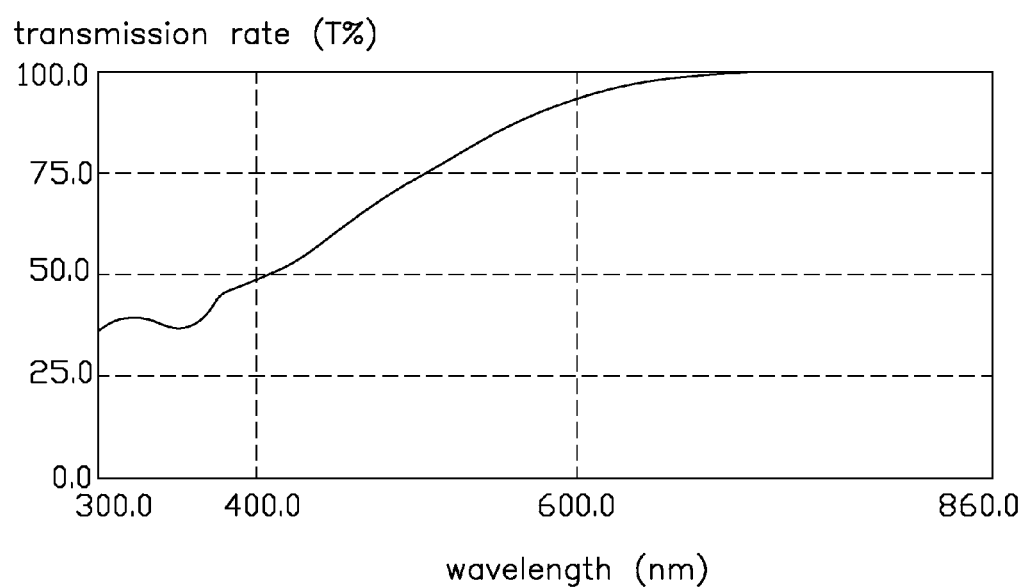

Referring to FIG. 5, the conjugated polymer of Example 2 weakly absorbs the ultraviolet light having a wavelength in a range from about 400 nm to about 600 nm and the visible light having a wavelength greater than 600 nm. Thus, the absorption of the ultraviolet light or visible light having a long wavelength indicates that the conjugated double bonds exist in the conjugated polymer.

It is further proven that the soluble conjugated polymer of Example 2 is formed by analyzing the FIGS. 4 and 5.

Example 3

In Example 3, the mass concentration of the PAN solution is about 1%. The catalyst is zinc chloride. A mass ratio of zinc chloride to the PAN is about 2.44:1. The PAN solution with the zinc chloride dispersed is heated at about 150 Celsius degrees by an oil bath, along with agitating the PAN solution at a rotating speed of about 500 rpm.

Specifically, the first solvent is DMF. The PAN solution is heated for about 24 hours to cyclize the PAN until the PAN solution becomes black, thereby forming the conjugated polymer by cyclizing reaction of PAN.

Furthermore, the zinc chloride and the first solvent are separated out using the solvent filter, thereby achieving the purified conjugated polymer.

Figure 6:
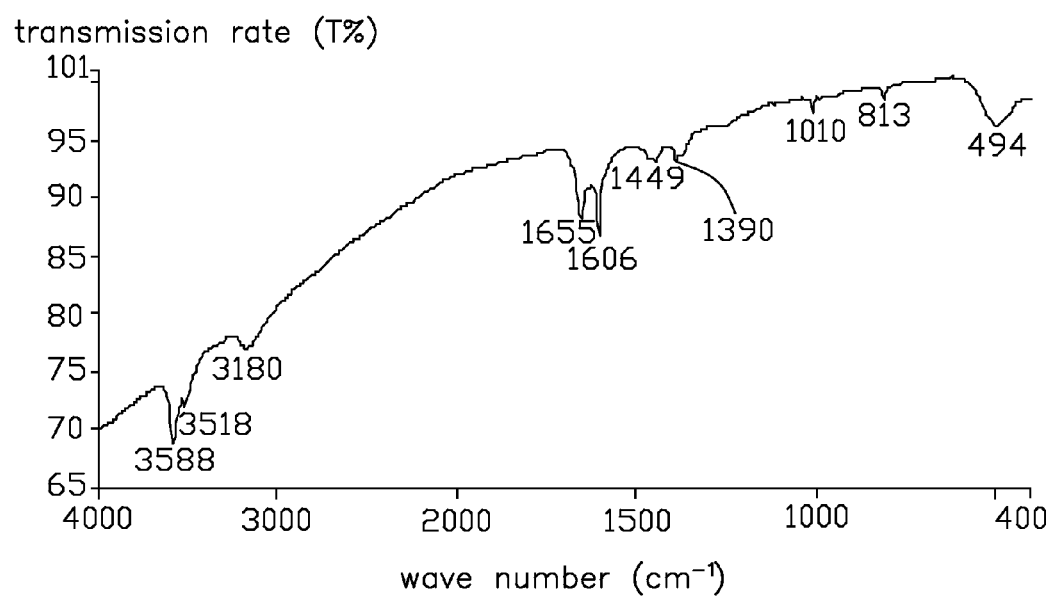

Referring to FIG. 6, the achieved conjugated polymer of Example 3 is tested. The characteristic absorption peak at 1655 $cm^{-1}$ corresponds to C=N bonds or C=C bonds. The peak at about 1655 $cm^{-1}$ indicates the PAN cyclizing reaction has occurred during the above method.

Figure 7:
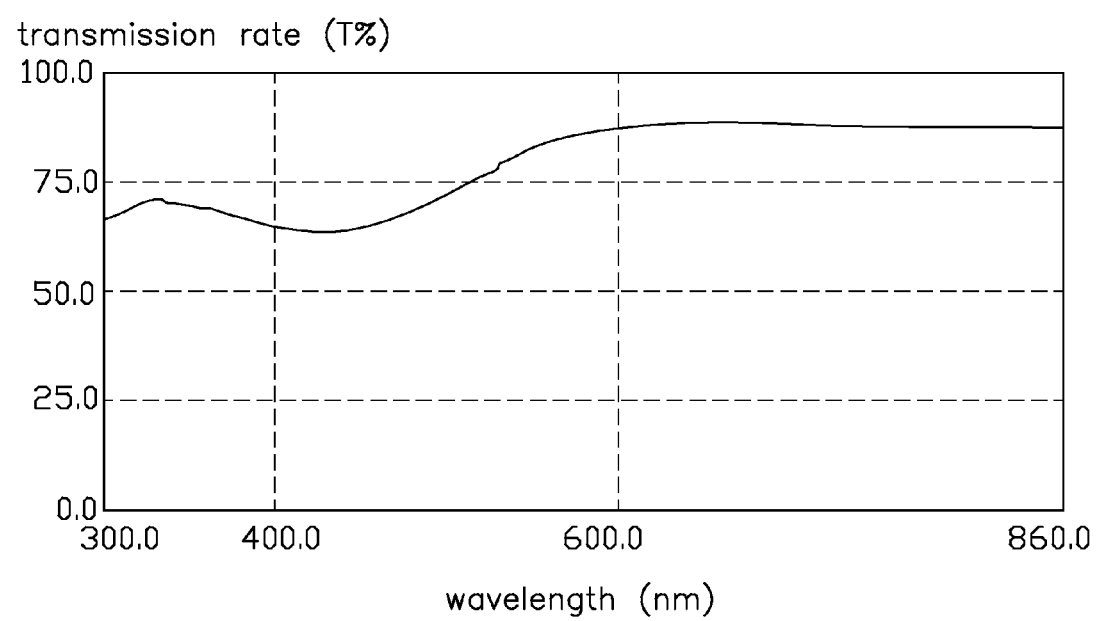

Referring to FIG. 7, the conjugated polymer of Example 3 uniformly absorbs the ultraviolet light having a wavelength in a range from about 400 nm to about 600 nm and the visible light having a wavelength in a range from about 600 nm to about 800 nm. Thus, the absorption of the ultraviolet light or visible light having a long wavelength indicates that the conjugated typed double bonds exist in the conjugated polymer, and the conjugated degree of the conjugated polymer is high.

It is proven that the soluble conjugated polymer has been formed by analyzing the FIGS. 6 and 7.

Example 4

In Example 4, the mass concentration of the PAN solution is about 6%. The catalyst is cobalt nitrate. A mass ratio of the cobalt nitrate to the PAN is about 27:5. The PAN solution with the cobalt nitrate dispersed therein is heated at about 150 degrees Celsius by oil bath, along with agitating the PAN solution at a rotating speed of about 250 rpm.

Specifically, the first solvent is DMF. The PAN solution is heated for about 48 hours to cyclize the PAN until the PAN solution becomes black, thereby forming the conjugated polymer by the PAN cyclizing reaction.

Furthermore, the cobalt nitrate and the first solvent are separated out using the solvent filter, thereby achieving the purified conjugated polymer.

Figure 8:
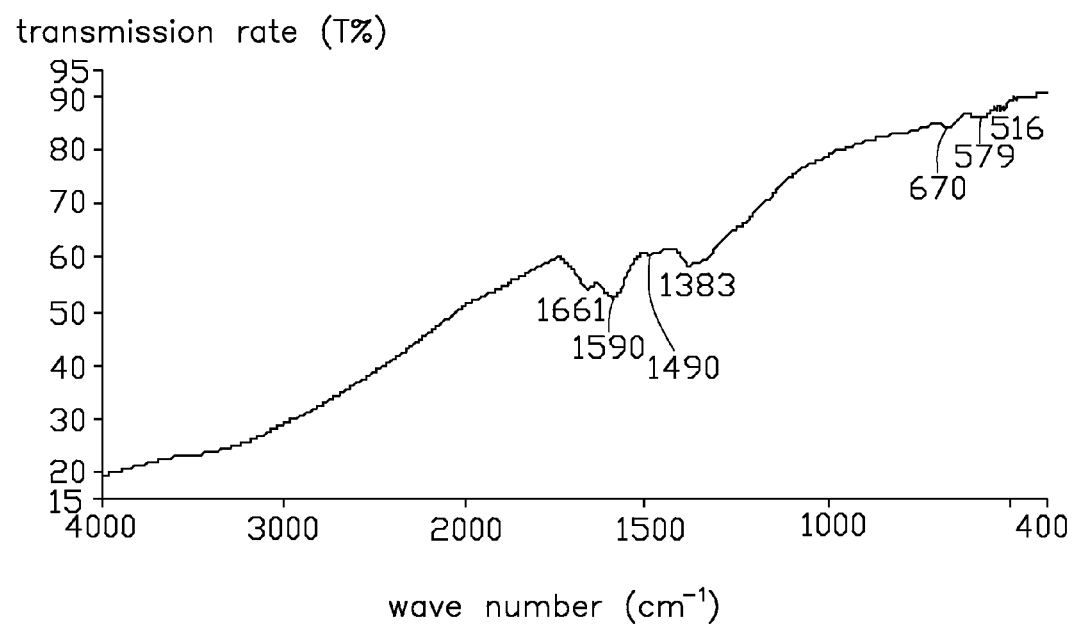

Referring to FIG. 8, the achieved conjugated polymer of Example 4 is tested. The characteristic absorption peak corresponding to C=C completely disappears. A group of characteristic absorption peaks near 1661 $cm^{-1}$ corresponding to C=N bonds or C=C bonds appears. Thus, the conjugated polymer is completely cyclized.

Figure 9:
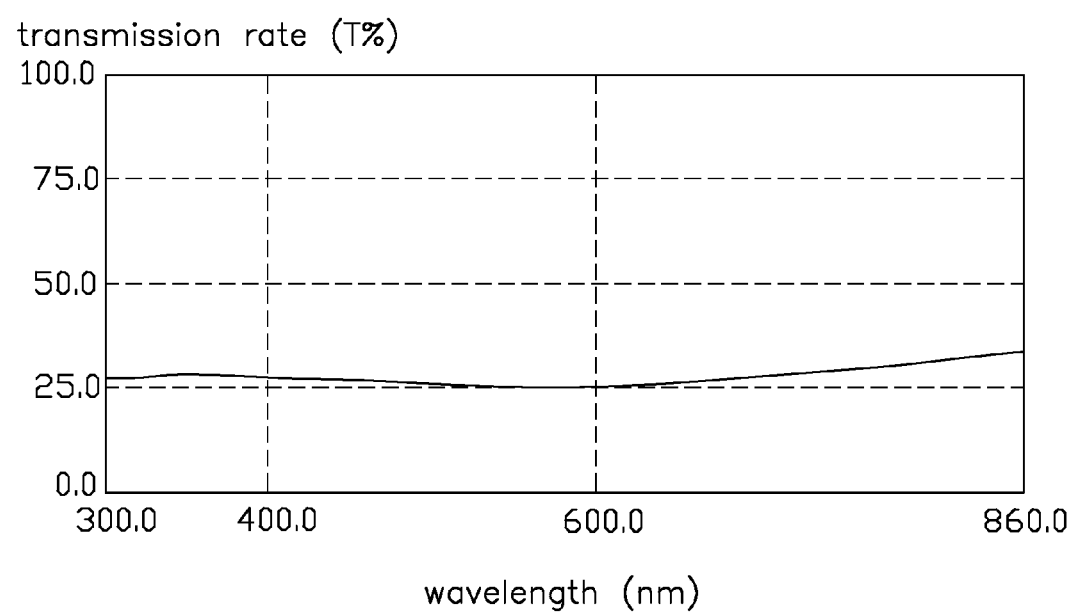

Referring to FIG. 9, the conjugated polymer of Example 4 uniformly absorbs the ultraviolet light having a wavelength in a range from about 400 nm to about 600 nm and the visible light having a wavelength in a range from about 600 nm to about 800 nm. The light absorbing ratio of the conjugated polymer is about 75%. Thus, the absorption of the ultraviolet light or visible light having a long wavelength indicates that the conjugated double bonds exist in the conjugated polymer, and the conjugated degree of the conjugated polymer is high.

It is proven the soluble conjugated typed polymer has been formed by analyzing the FIGS. 8 and 9.

Example 5

In an example 5, the mass concentration of the PAN solution is about 4%. The catalyst is titanium oxide powder. A mass ratio of the titanium oxide powder to the PAN is about 1:5. The PAN solution with the titanium oxide powder dispersed therein is heated at about 150 degrees Celsius by an oil bath, along with agitating the PAN solution at a rotating speed of about 500 rpm.

Specifically, the first solvent is DMF. The PAN solution is heated for about 16 days to cyclize the PAN until the PAN solution becomes black, thereby forming the conjugated polymer by the PAN cyclizing reaction.

Furthermore, the titanium oxide is separated out using the filter gauze, and the first solvent is separated out using the solvent filter, thereby achieving the purified conjugated polymer.

Figure 10:
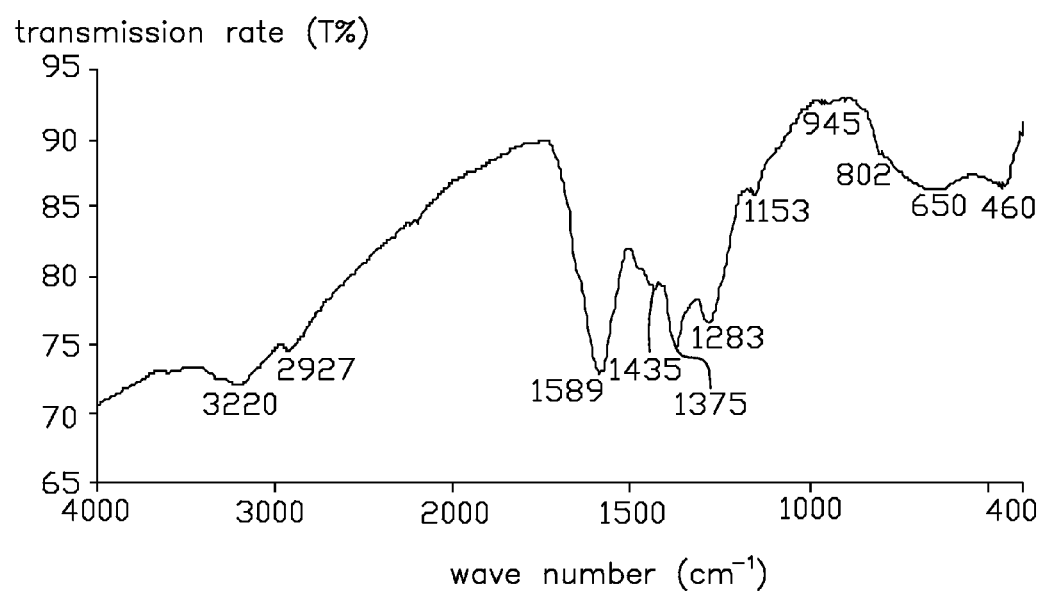

Referring to FIG. 10, the achieved conjugated polymer of Example 5 is tested. The characteristic absorption peak at about 1589 $cm^{-1}$ corresponds to C=N bonds or C=C bonds. The characteristic absorption peak at about 1589 $cm^{-1}$ indicates the PAN cyclizing reaction has occurred during the above method.

Figure 11:
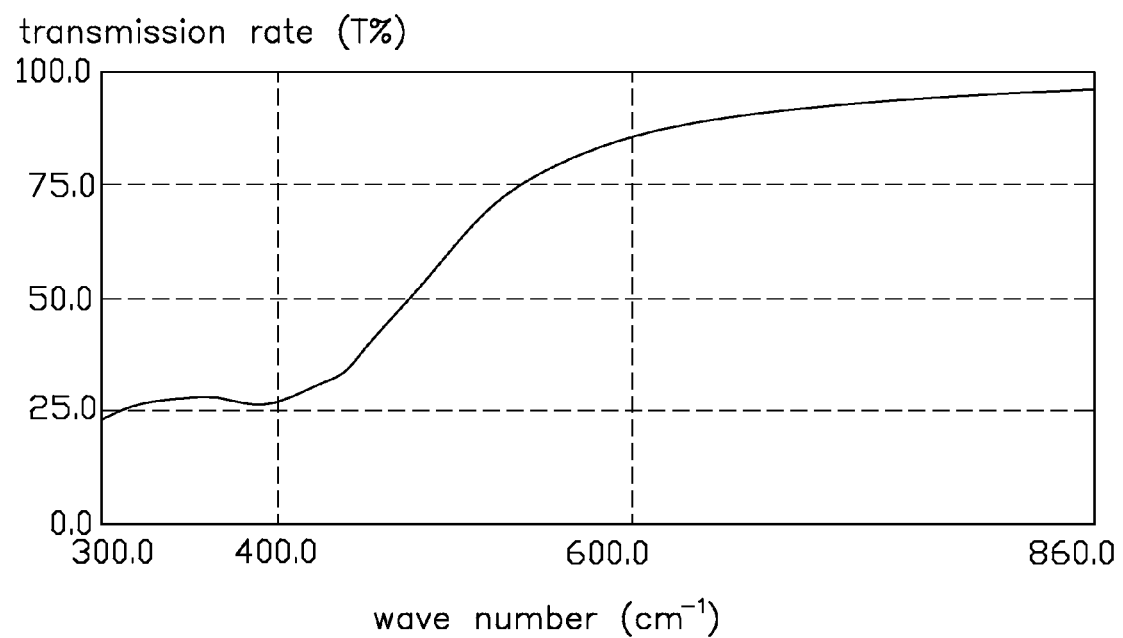

Referring to FIG. 11, the conjugated polymer in Example 5 uniformly absorbs the ultraviolet light having a wavelength in a range from about 400 nm to about 600 nm and the visible light having a wavelength in a range from about 600 nm to about 800 nm. Thus, the absorption of the ultraviolet light or visible light having a long wavelength indicates that the conjugated typed double bonds exist in the conjugated polymer, and the conjugated degree of the conjugated polymer is high.

It is proven the soluble conjugated polymer is formed by analyzing the FIGS. 10 and 11.

The conjugated polymer can absorb the ultraviolet light and the visible light, and has the conjugated typed C=C bonds or C=N bonds. Thus, the conjugated polymer has good electrical conductivity and ionic conductivity, and can be used in a lithium-ion battery. The conjugated polymer is soluble in some solvents to conveniently process it into a film, thereby increasing the number of applications. A sulfurized polyacrylonitrile can be formed by using the conjugated polymer.

One embodiment of a method for making the sulfurized polyacrylonitrile using any conjugated polymer of the above examples includes the following steps:

M1, providing sulfur (S) or sodium thiosulfate ($Na_2S_2O_3$);

M2, uniformly mixing the sulfur or sodium thiosulfate with the conjugated polymer to form a mixture; and M3, heating the mixture, thereby forming the sulfurized polyacrylonitrile.

In step M2, the sulfur or sodium thiosulfate and the conjugated polymer can be mixed to form a solid-solid mixture or a solid-liquid mixture. To form the solid-liquid mixture, the sulfur or the sodium thiosulfate can be uniformly dispersed in the above first conjugated polymer solution of the step S3. In another embodiment, the obtained pure conjugated polymer of the step S4 can be dissolved in a second solvent to form a second conjugated polymer solution. The sulfur or the sodium thiosulfate is then dispersed in the second conjugated polymer solution.

If the sulfur or the sodium thiosulfate is uniformly dispersed in the first conjugated polymer solution with an insoluble catalyst, the catalyst can be separated out using the filter gauze before the step M1. If the sulfur or the sodium thiosulfate is uniformly dispersed in the first conjugated polymer solution with a soluble catalyst, the catalyst and the first solvent can be separated out using the solvent filter after forming the sulfurized polyacrylonitrile, thereby achieving the purified sulfurized polyacrylonitrile. The second solvent and the first solvent can be the same or different. The second solvent can be DMF, DMA, DMSO, malononitrile, sulfolane, or ethyl nitrite. A molar ratio of the conjugated polymer to the sulfur or the sodium thiosulfate can be in a range from about 1:1 to about 1:6. If the sulfur or the sodium thiosulfate is uniformly dispersed in the conjugated polymer solution to form the solid-liquid mixture, the mass percentage of the solute in the solid-liquid mixture can be in a range from about 5% to about 50%. The solute is the sulfur or the sodium thiosulfate, and the conjugated polymer. Furthermore, magnetic stirring, ultrasonic dispersion, or mechanical agitation can agitate the solid-liquid mixture. If the sulfur or the sodium thiosulfate, and the conjugated polymer are mixed to form solid-solid mixture, the solid-solid mixture can be ball-milled.

In step M3, if the sulfur or the sodium thiosulfate, and the conjugated polymer are mixed to form the solid-solid mixture, the heating temperature can be in a range from about 200 degrees Celsius to about 600 degrees Celsius, the heating period can be in a range from about 5 minutes to about 10 hours. If the sulfur or the sodium thiosulfate, and the conjugated polymer are mixed to form the solid-liquid mixture, the heating temperature can be in a range from about 60 degrees Celsius to about 150 degrees Celsius, the heating period can be in a range from about 5 minutes to about 10 days. The mixture can be heated in a water bath or oil bath under an inert atmosphere. The inert atmosphere can be a nitrogen atmosphere or argon atmosphere.

In the above method, the sulfurized polyacrylonitrile is formed by a vulcanization reaction of the conjugated polymer and further cyclized in the reaction process. Thus, the sulfurized polyacrylonitrile has a high cyclization degree and conductivity.

In one example, the sulfur and the conjugated polymer are mixed in a molar ratio of about 1:4 to form a solid-solid mixture. The solid-solid mixture is ball-milled for about a half hour, and then heated at about 300 degrees Celsius for about two hours in an oil bath to form the sulfurized polyacrylonitrile. In another example, the molar ratio of the sulfur to the conjugated polymer is changed to about 1:6 with the other conditions remaining the same.

Figure 12:
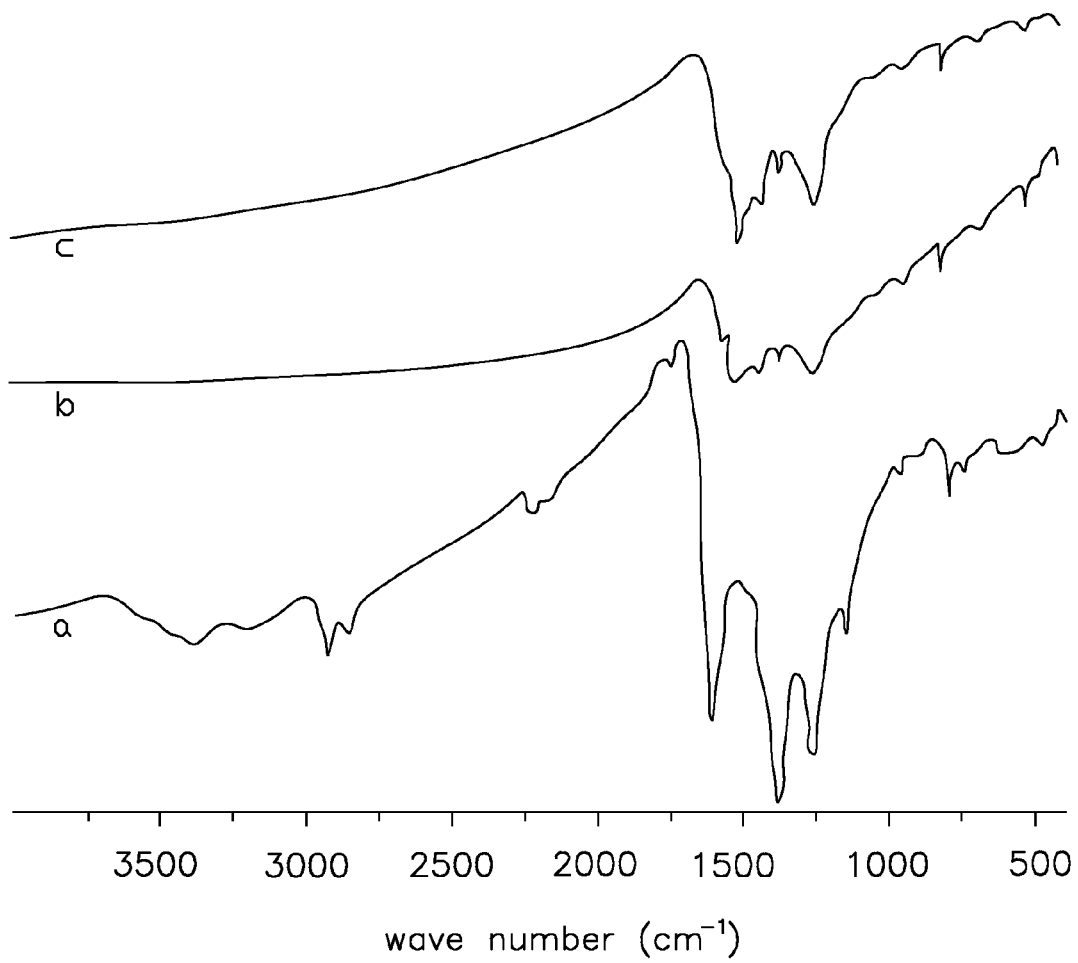
FIG. 12 is a FTIR spectrum test graph of embodiments of the conjugated polymer and the sulfurized polyacrylonitrile formed by heating a mixture composed of sulfur and conjugated polymer in molar ratio of 1:4 and 1:6.

Referring to FIG. 12, curve "a" represents an FTIR spectrum of the conjugated polymer used in the Examples 1-5 for forming the sulfurized polyacrylonitrile. Curve "b" represents an FTIR spectrum of the sulfurized polyacrylonitrile formed in the example having the molar ratio of about 1:4. Curve "c" represents an FTIR spectrum of the sulfurized polyacrylonitrile formed in the example having the molar ratio of about 1:6. The characteristic absorption peak at about 2500 $cm^{-1}$ corresponding to C≡N bonds has disappeared in the curve "b" and the curve "c" compared with the curve "a." The characteristic absorption peaks near about 1500 $cm^{-1}$ corresponding to C=C bonds or C=N bonds appear in the curve "b" and the curve "c," which indicate the sulfurized polyacrylonitrile has been completely cyclized.

Figure 13:
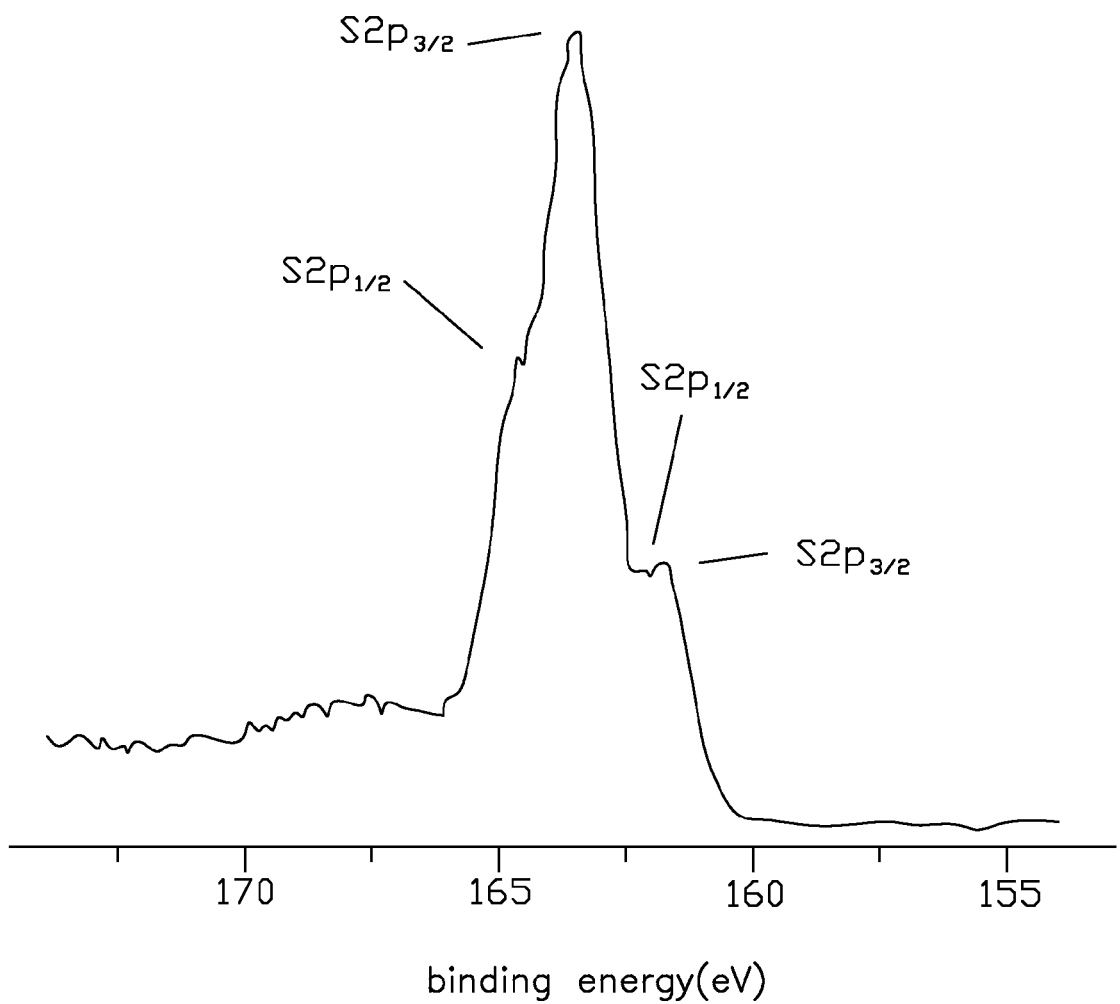
FIG. 13 is an X-ray Photoelectron Spectroscopy (XPS) test graph of sulfur elements in one embodiment of the sulfurized polyacrylonitrile fabricated by heating the mixture composed of the sulfur and the conjugated polymer in the molar ratio of 1:4.
Figure 14:
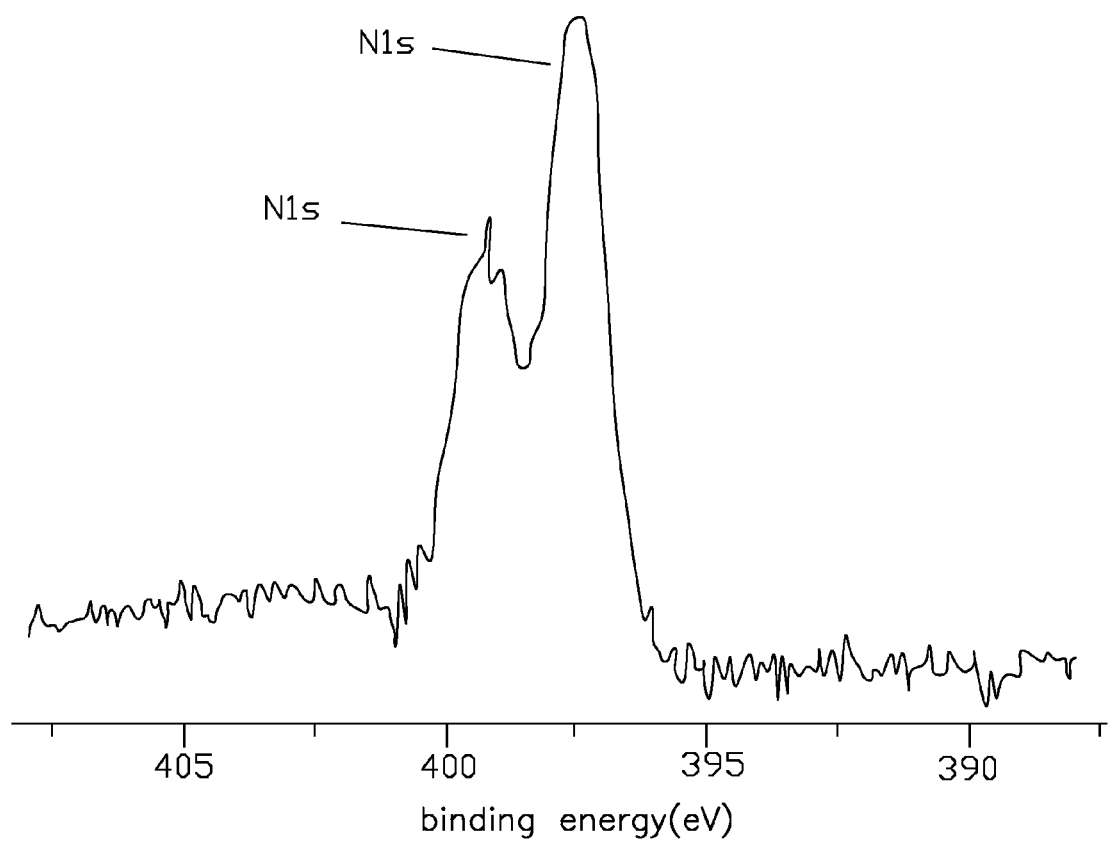
FIG. 14 is an XPS test graph of nitrogen elements in one embodiment of the sulfurized polyacrylonitrile fabricated by heating the mixture composed of sulfur and the conjugated polymer in the molar ratio of 1:4.

Referring to FIGS. 13 and 14, XPS test graphs of sulfur elements and nitrogen elements in the sulfurized polyacrylonitrile formed in the example having the molar ratio of about 1:4 are shown. FIGS. 13 and 14 show that reduced-state sulfur elements and oxidized-state nitrogen elements exist in the sulfurized polyacrylonitrile, which indicates the nitrogen element in cyano group (C≡N) obtains electrons, and the sulfur element loses electrons, thereby forming N=S bonds.

The sulfurized polyacrylonitrile formed by the above method includes a structural unit. The general molecular formula of the structural unit is $\mathrm{-\!\!\!\!-[C_3HNS]\!\!-\!\!\!\!-}_n$, wherein n is a positive integer such as 1, 2, 3, and so on. The structural formula of the structural unit is

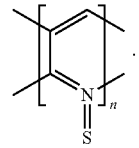

The structural unit can be a main portion of the molecular structure of the sulfurized polyacrylonitrile. The sulfurized polyacrylonitrile may have other structural units without being cyclized.

The sulfurized polyacrylonitrile can be used as a cathode active material of a lithium-ion battery. The lithium-ion battery also includes an anode active material corresponding to the cathode active material. The anode active material can be lithium metal, native graphite, pyrolysis carbon, or metal alloy. If the anode active material is a non-lithium material such as native graphite, pyrolysis carbon, and metal alloy, then at least one of the cathode active material and the anode active material needs to have lithium ions inserted therein before using.

The process of inserting the lithium ions into the sulfurized polyacrylonitrile at different voltages can be represented using the following reaction formulas:

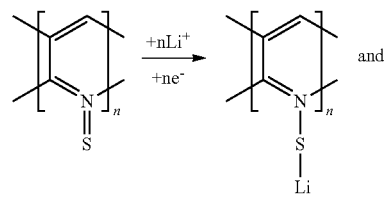

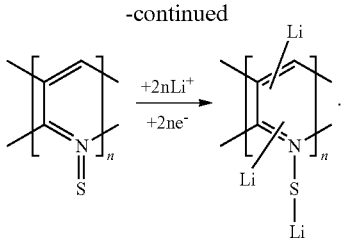

The sulfurized polyacrylonitrile with inserted lithium ions or only the sulfurized polyacrylonitrile without inserted lithium ions can be directly used as the cathode active material of a lithium-ion battery. If the sulfurized polyacrylonitrile having lithium inserted therein is used as the cathode active material, according to the above two formulas, the cathode active material may have two possible structures. One structure of the cathode active material can include a structural unit with a general molecular formula of $-\!\!\left[\!-C_3HNSLi\!-\!\right]_n\!\!-$, wherein n is positive integer and can be 1, 2, 3, and so on, the structural formula of the structural unit being

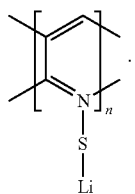

Another structure of the cathode active material can include a structural unit with a general molecular formula of $-\!\!\left[\!-C_3HNSLi_3\!-\!\right]_n\!\!-$, wherein n is positive integer and can be 1, 2, 3, and so on, the structural formula of the structural unit being

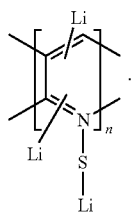

In one embodiment, the lithium-ion battery is fabricated by the following steps:

mixing the sulfurized polyacrylonitrile, a conductive agent, and an adhesive agent to form a slurry, wherein a mass percent of the sulfurized polyacrylonitrile is in a range from about 85% to about 98%, a mass percent of the conductive agent is in a range from about 1% to about 10%, and a mass percent of the adhesive agent is in a range from about 1% to about 5%;

coating the slurry on the aluminum current collector to form a cathode electrode;

providing an anode electrode and an electrolyte solution, wherein the anode electrode is lithium metal, the electrolyte solution is formed by dissolving the lithium hexafluorophosphate ($LiPF_6$) having a molar concentration of 1 mol/L in a solvent, and the solvent is composed of ethylene carbonate (EC) and ethyl methyl carbonate (EMC) in a volume ratio of about 1:1.

The lithium-ion battery is tested for the charge/discharge properties at different voltage ranges.

Figure 15:
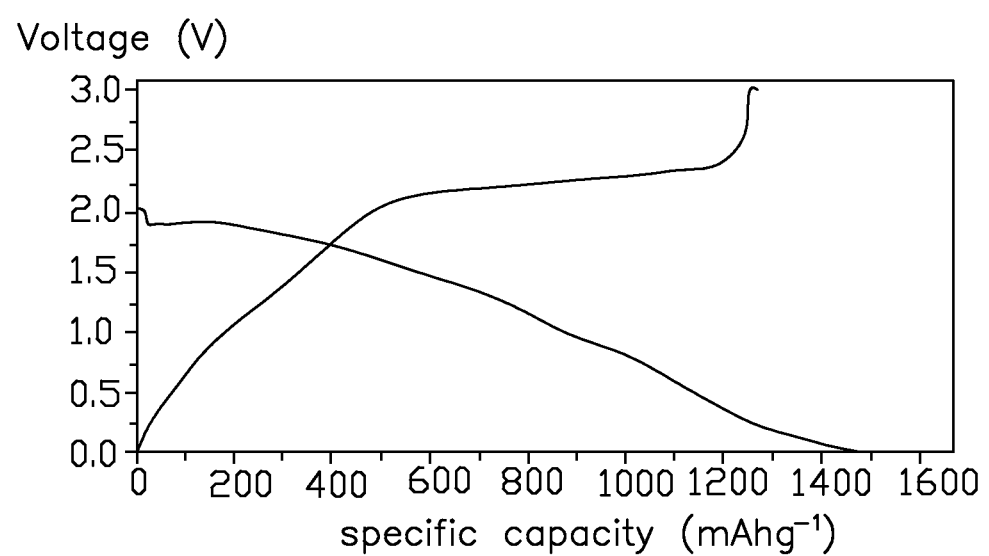
FIG. 15 is a test graph showing charge/discharge curves at 0.2 Coulomb (C) rates of one embodiment of the sulfurized polyacrylonitrile served as the lithium battery cathode active material.

Referring to FIG. 15, the lithium-ion battery is cycled at a voltage of about 0 Volt (V) to about 3V and at about a 0.2 C rate. The charge specific capacity of the lithium-ion battery is about 1271 $mAhg^{-1}$. The discharge specific capacity of the lithium-ion battery is about 1502.3 $mAhg^{-1}$.

Figure 16:
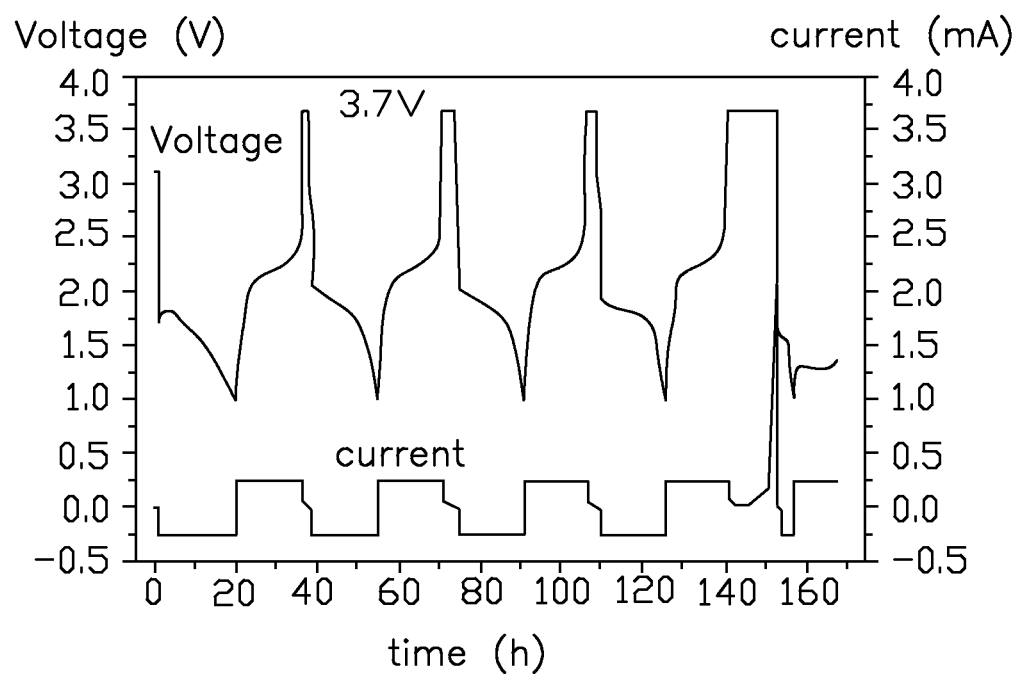
FIG. 16 is a test graph showing charge/discharge cycling curves in a voltage range from 1 volt (V) to 3.7 V of one embodiment of the sulfurized polyacrylonitrile served as the lithium battery cathode active material.

Referring to FIG. 16, the lithium-ion battery is charged to about 3.7V at a constant current of about 0.25 mA, and then charged at the constant voltage of about 3.7V until the current decreases to about 0 mA. After that, the lithium-ion battery is discharged at a constant current of about 0.25 mA until the voltage drops to about 1 V. In this condition, the lithium-ion battery can be charged and discharged repeatedly for only about three cycles.

Figure 17:
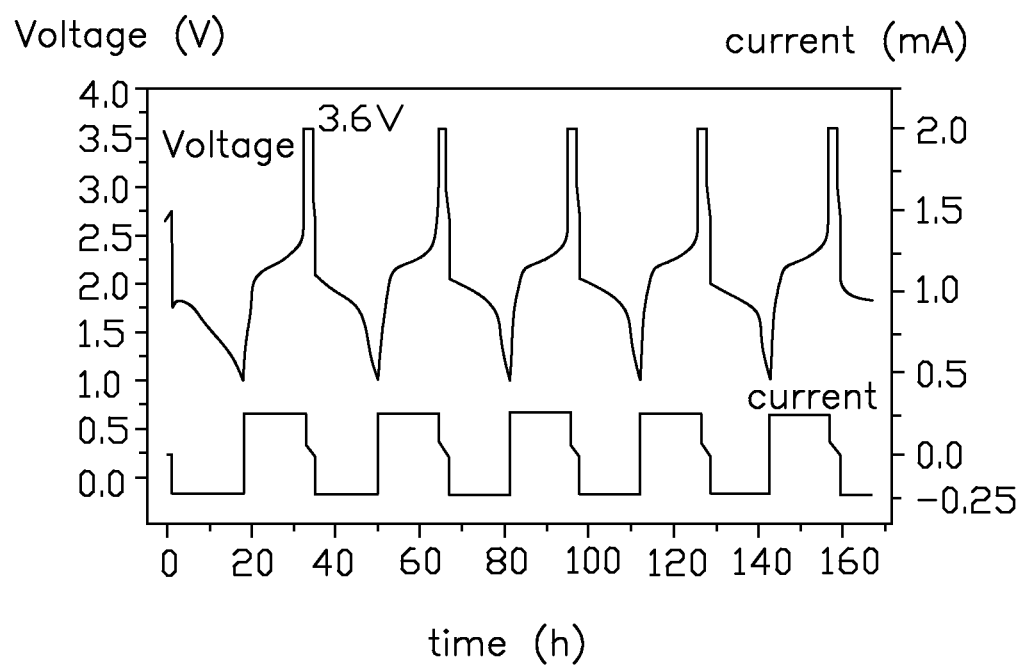
FIG. 17 is a test graph showing charge/discharge cycling curves in a voltage range from 1 V to 3.6 V of one embodiment of the sulfurized polyacrylonitrile served as the lithium battery cathode active material.

Referring to FIG. 17, the lithium-ion battery is charged to about 3.6V at a constant current of about 0.25 mA, and then charged at the constant voltage of about 3.6V until the current decreases to about 0 mA. After that, the lithium-ion battery is discharged at a constant current of about 0.25 mA until the voltage drops to about 1 V. FIG. 17 shows that the lithium-ion battery has a good cycling property. Thus, the cut-off voltage for the charge of the lithium-ion battery should be set to less than or equal to about 3.6 V.

Figure 18:
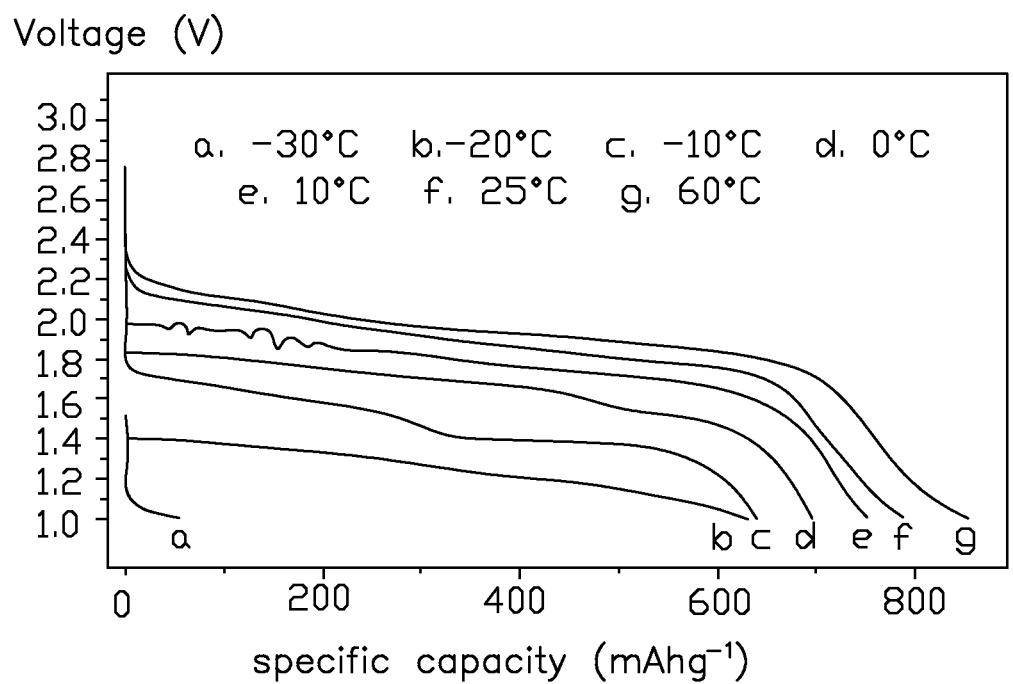
FIG. 18 is a test graph showing discharge curves under different temperatures of one embodiment of the sulfurized polyacrylonitrile served as the lithium battery cathode active material.

The lithium-ion battery is tested for the charge/discharge properties at different temperatures. Referring to FIG. 18, the lithium-ion battery is discharged at about −30° C., about −20° C., about −10° C., about 0° C., about 10° C., about 25° C., and about 60° C. The discharge specific capacity decreases from about 854 mAh $g^{-1}$ to about 632 mAh $g^{-1}$ as the temperature decreases from about 60° C. to about −20° C. The discharge specific capacity dramatically decreases from about 632 mAh $g^{-1}$ to about 57 mAh $g^{-1}$ as the temperature decreases from about −20° C. to about −30° C. Thus, the lithium-ion battery can be normally operated in a temperature range from about −20° C. to about 60° C.

Figure 19:
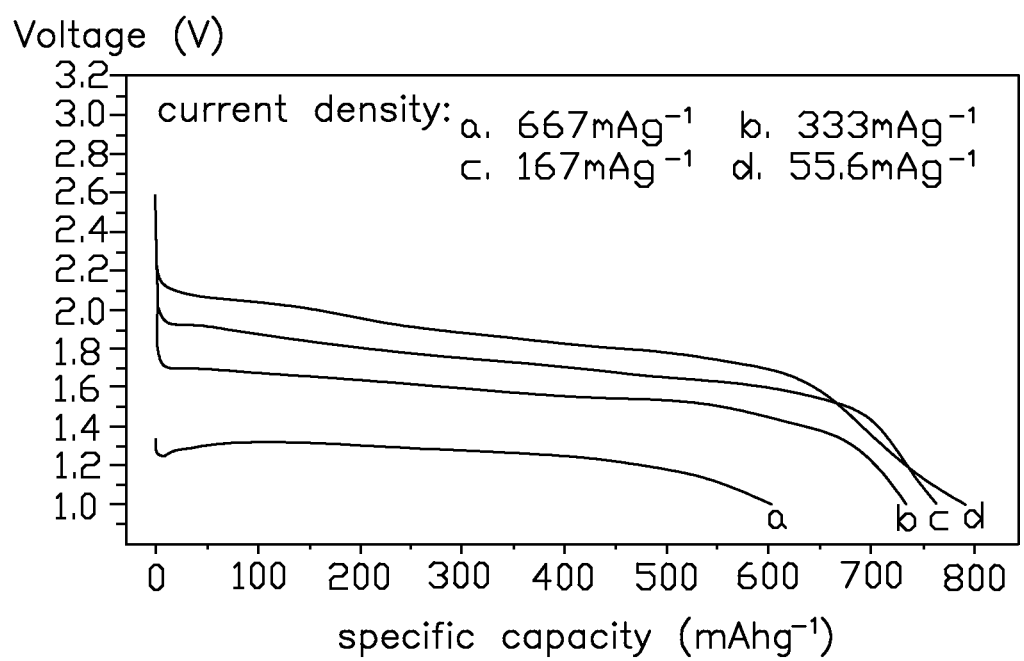
FIG. 19 is a test graph showing discharge curves under different current densities of one embodiment of the polyacrylonitrile sulfide served as the lithium battery cathode active material.

The lithium-ion battery is tested for the charge/discharge properties at current density. Referring to FIG. 19, the lithium-ion battery is discharged at a constant current of about 667 $mAg^{-1}$, about 333 $mAg^{-1}$, about 167 $mAg^{-1}$, and about 55.6 $mAg^{-1}$. The discharge specific capacity decreases as the current density increases. The discharge specific capacity is about 792 mAh $g^{-1}$ at the current density of about 55.6 $mAg^{-1}$, and the discharge specific capacity is about 604 mAh $g^{-1}$ at the current density of about 667 mA $g^{-1}$.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A sulfurized polyacrylonitrile, comprising a structural unit, wherein a general molecular formula of the structural unit is $\text{---}[\text{C}_3\text{HNS}]\text{---}_n$, and a general structural formula of the structural unit

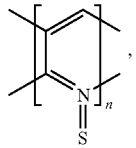

wherein n is a positive integer in the general molecular formula and the general structural formula.

2. A lithium-ion battery cathode active material, comprising a sulfurized polyacrylonitrile comprising a structural unit, wherein a general molecular formula of the structural unit is $\text{---}[\text{C}_3\text{HNS}]\text{---}_n$, and a general structural formula of the structural unit is

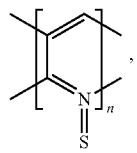

wherein n is a positive integer in the general molecular formula and the general structural formula.

3. The lithium-ion battery cathode active material as claimed in claim 2, wherein a cut-off voltage for a charge of a lithium-ion battery using the lithium-ion battery cathode active material is less than or equal to 3.6 V.

4. The lithium-ion battery cathode active material as claimed in claim 2, wherein an operating temperature of a lithium-ion battery using the lithium-ion battery cathode active material is in a range from about −20 degrees Celsius to about 60 degrees Celsius.

* * * * *